United States Patent
Iizawa et al.

(10) Patent No.: US 12,013,526 B2
(45) Date of Patent: Jun. 18, 2024

(54) PHOSPHOR WHEEL

(71) Applicant: Panasonic Intellectual Property Management Co., Ltd., Osaka (JP)

(72) Inventors: Noboru Iizawa, Osaka (JP); Yosuke Honda, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 18/259,975

(22) PCT Filed: Dec. 21, 2021

(86) PCT No.: PCT/JP2021/047247
§ 371 (c)(1),
(2) Date: Jun. 29, 2023

(87) PCT Pub. No.: WO2022/163217
PCT Pub. Date: Aug. 4, 2022

(65) Prior Publication Data
US 2024/0053599 A1 Feb. 15, 2024

(30) Foreign Application Priority Data

Jan. 26, 2021 (JP) ................................. 2021-010586

(51) Int. Cl.
*G02B 26/00* (2006.01)
*F21V 29/502* (2015.01)
(52) U.S. Cl.
CPC .......... *G02B 26/008* (2013.01); *F21V 29/502* (2015.01)
(58) Field of Classification Search
CPC ..... G02B 26/008; F21V 29/502; F21V 29/74; F21V 9/30; F21V 9/32; F21V 9/35; F21V 9/38
See application file for complete search history.

(56) References Cited

U.S. PATENT DOCUMENTS 11,422,360 B2 * 8/2022 Li ........................ G03B 21/204
2013/0301237 A1 11/2013 Finsterbusch et al.
(Continued)

FOREIGN PATENT DOCUMENTS

| JP | 2003-346546 A | 12/2003 |
| JP | 5661947 B2 | 1/2015 |

(Continued)

OTHER PUBLICATIONS

International Search Report dated Feb. 22, 2022 in International Patent Application No. PCT/JP2021/047247, with English translation.

*Primary Examiner* — Erin Kryukova
(74) *Attorney, Agent, or Firm* — Rimon P.C.

(57) ABSTRACT

A phosphor wheel includes: a substrate including a first principal surface and a second principal surface; a phosphor layer; and a heat dissipating member. The heat dissipating member includes: a projecting portion projecting toward one of the principal surfaces and including (i) a contact surface that contacts the one of the principal surfaces and (ii) a peripheral wall to which the contact surface serves as a bottom surface; and fins provided by cutting and raising regions in a peripheral region of the heat dissipating member excluding a central portion of the heat dissipating member. The projecting portion includes, in the peripheral wall, through-holes provided for ventilation. The projecting portion contacts the substrate via the contact surface to secure a certain distance between the substrate and the heat dissipating member and conduct heat in the substrate to the peripheral region of the heat dissipating member.

7 Claims, 14 Drawing Sheets

(56) References Cited

U.S. PATENT DOCUMENTS

| | | | |
|---|---|---|---|
| 2016/0077326 A1* | 3/2016 | Yamagishi | G02B 26/008 |
| | | | 353/61 |
| 2017/0261844 A1* | 9/2017 | Kitade | H04N 9/3158 |
| 2019/0146314 A1* | 5/2019 | Yoshikawa | G03B 21/204 |
| | | | 362/84 |
| 2019/0353993 A1* | 11/2019 | Ikeo | F21S 2/00 |
| 2020/0089092 A1* | 3/2020 | Yamagishi | G03B 21/204 |
| 2021/0286165 A1 | 9/2021 | Asano | |

FOREIGN PATENT DOCUMENTS

| | | |
|---|---|---|
| JP | 2016-225029 A | 12/2016 |
| JP | 2018-055054 A | 4/2018 |
| WO | 2017/154048 A1 | 9/2017 |
| WO | 2018/074125 A1 | 4/2018 |

* cited by examiner

PHOSPHOR WHEEL

CROSS-REFERENCE OF RELATED APPLICATIONS

This application is the U.S. National Phase under 35 U.S.C. § 371 of International Patent Application No. PCT/JP2021/047247, filed on Dec. 21, 2021, which in turn claims the benefit of Japanese Patent Application No. 2021-010586, filed on Jan. 26, 2021, the entire disclosures of which Applications are incorporated by reference herein.

TECHNICAL FIELD

The present disclosure relates to a phosphor wheel.

BACKGROUND ART

A phosphor wheel that emits light in response to laser light (excitation light) emitted from a laser light source is one example of a light source device used in a laser projector or the like. In order to inhibit deterioration of a phosphor wheel caused by heat produced in a phosphor layer upon receiving laser light, the phosphor wheel is rotated about an axis of rotation while the phosphor layer is being irradiated with laser light.

According to one technique disclosed for improving the heat dissipation performance of a phosphor wheel, fins of a wing-like structure are formed in a clearance space across which two support members each having phosphor provided on its two side surfaces face each other (see, for example, Patent Literature (PTL) 1). According to PTL 1, dissipation of heat produced in the phosphor can be promoted as the air serving as a cooling medium passes through the clearance space, and this can help improve the heat dissipation performance of the phosphor wheel.

CITATION LIST

Patent Literature

[PTL 1] Japanese Patent No. 5661947

SUMMARY OF INVENTION

Technical Problem

In recent years, there exists a desire to further enhance the heat dissipation performance of phosphor wheels.

The present disclosure provides a phosphor wheel with further improved heat dissipation performance.

Solution to Problem

In order to achieve the above object, a phosphor wheel according to an aspect of the present disclosure is a phosphor wheel including: a substrate including a first principal surface and a second principal surface on opposite sides of the substrate; a phosphor layer provided on the first principal surface; and a heat dissipating member disposed facing one of the first principal surface or the second principal surface and rotated along with the substrate, the heat dissipating member being a plate member, wherein the heat dissipating member includes: a projecting portion provided at a central portion of the heat dissipating member to project toward the one of the first principal surface or the second principal surface, the projecting portion including (i) a contact surface that contacts the one of the first principal surface or the second principal surface and (ii) a peripheral wall to which the contact surface serves as a bottom surface; and a plurality of fins provided by cutting and raising a plurality of regions in a peripheral region of the heat dissipating member excluding the central portion, the projecting portion includes, in the peripheral wall, a plurality of through-holes provided for ventilation, and the projecting portion contacts the substrate via the contact surface to secure a certain distance between the substrate and the heat dissipating member and conduct heat in the substrate to the peripheral region of the heat dissipating member.

Advantageous Effects of Invention

A phosphor wheel according to the present disclosure can exhibit further improved heat dissipation performance.

DESCRIPTION OF EMBODIMENTS

Figure 1:
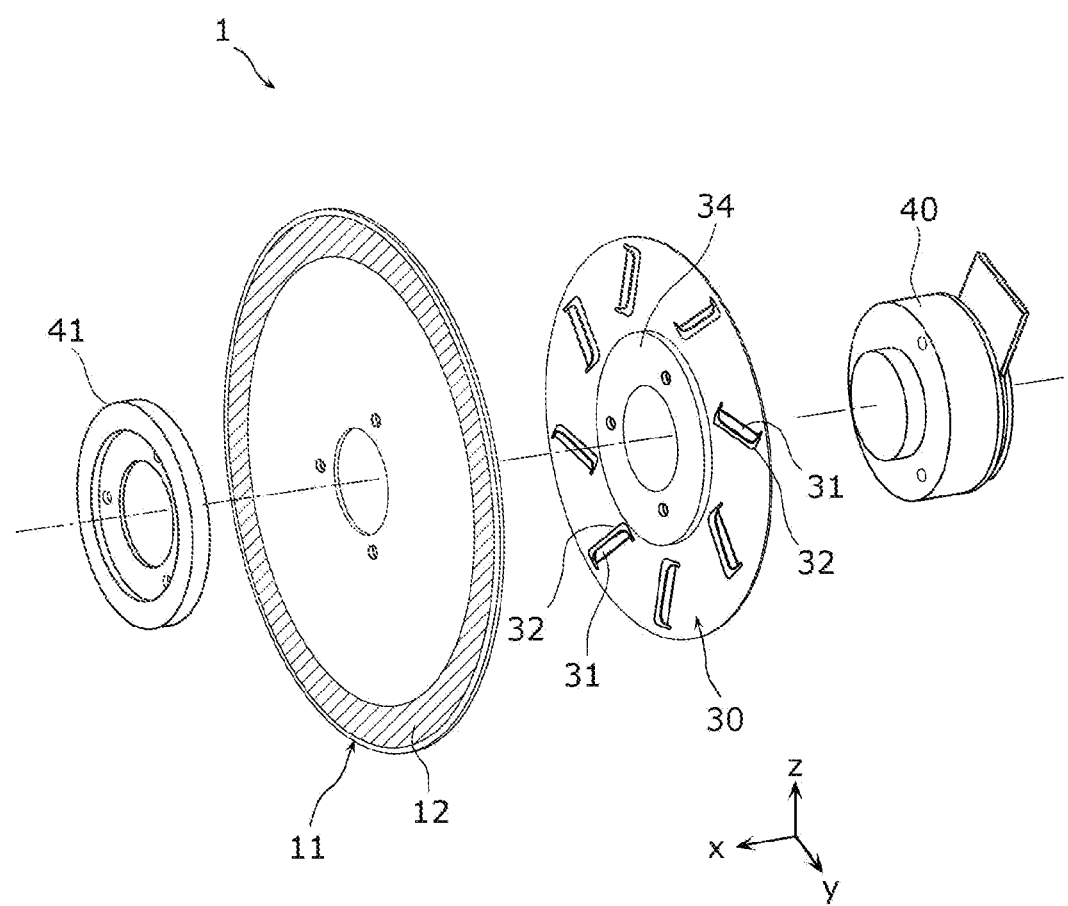
FIG. 1 is an exploded perspective view of a phosphor wheel according to Embodiment 1.

Hereinafter, embodiments of the present disclosure will be described with reference to the accompanying drawings. The embodiments described below each illustrate a specific example of the present disclosure. Therefore, numerical values, shapes, materials, constituent elements, the arrangement and connection of the constituent elements, etc. illustrated in the embodiments below are mere examples, and do not intend to limit the present disclosure. As such, among the constituent elements in the embodiments below, constituent elements not recited in the independent claim representing the most generic concept of the present disclosure will be described as optional constituent elements.

Note that the drawings are represented schematically and are not necessarily precise illustrations. Additionally, in the drawings, constituent elements that are essentially the same share the same reference signs, and duplicate descriptions will be omitted or simplified.

Some of the drawings referred to in the description of the following embodiments include coordinate axes. The Z-axis direction is regarded as the heightwise direction of a phosphor wheel. The positive side on the Z-axis may be expressed as the upper side (upward), and the negative side on the Z-axis may be expressed as the lower side (downward). The X-axis direction and the Y-axis direction are orthogonal to each other along a plane perpendicular to the Z-axis direction. In the following embodiments, a front view shows an object as viewed from the positive side on the X-axis, a rear view shows an object as viewed from the negative side on the X-axis, and a side view shows an object as viewed in the Y-axis direction.

Embodiment 1

[Phosphor Wheel 1]

Figure 2:
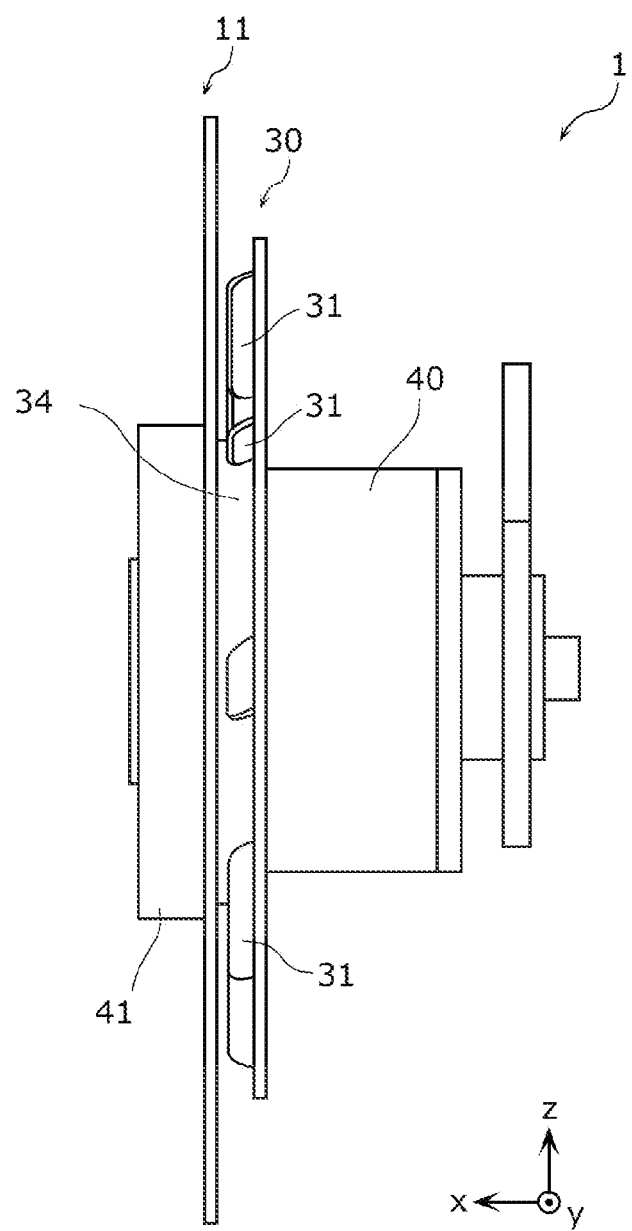
FIG. 2 is a side view of the phosphor wheel according to Embodiment 1.

Hereinafter, a configuration of phosphor wheel 1 according to Embodiment 1 will be described with reference to FIG. 1 and FIG. 2. FIG. 1 is an exploded perspective view of phosphor wheel 1 according to Embodiment 1. FIG. 2 is a side view of phosphor wheel 1 according to Embodiment 1.

Phosphor wheel 1 according to Embodiment 1 is a reflective phosphor wheel and is used in, for example, a light source of a laser projector, an illumination device for facilities, an endoscope, or the like. As illustrated in FIG. 1 and FIG. 2, phosphor wheel 1 includes substrate 11, phosphor layer 12 provided on substrate 11, heat dissipating member 30, motor 40, and adjusting plate 41. Note that adjusting plate 41 is used to adjust any shift in the center of gravity that occurs during rotation so as to transmit rotary power of motor to substrate 11 and so on in a well-balanced manner, but is not an essential element. Adjusting plate 41 may be a hub of motor 40.

[Substrate 11]

Figure 3:
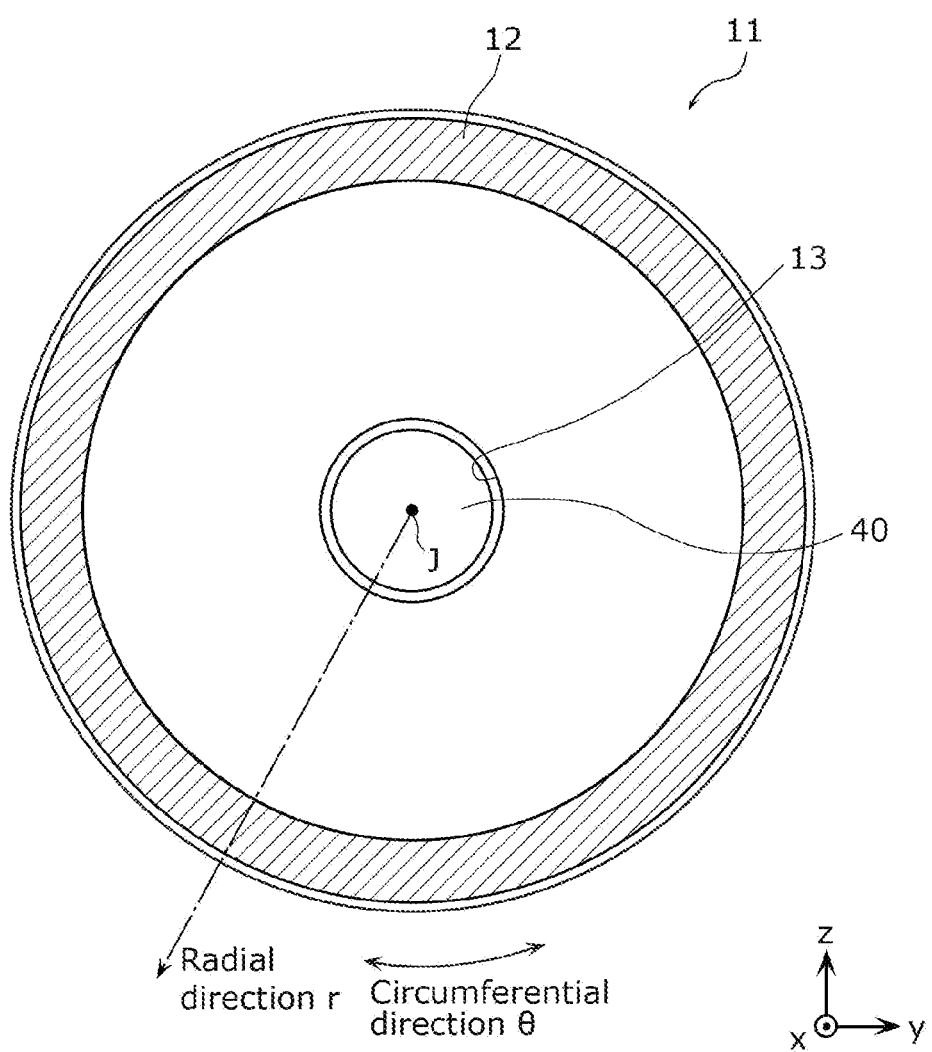
FIG. 3 is a front view of a substrate according to Embodiment 1 as viewed from the first principal surface side.

FIG. 3 is a front view of substrate 11 according to Embodiment 1 as viewed from the first principal surface side.

Substrate 11 includes a first principal surface and a second principal surface on opposite sides of substrate 11, and is a disc-shaped plate member that is driven by motor 40 to rotate about axis of rotation J. In other words, the shape of substrate 11 in plan view is circular. Note that the shape in plan view is a shape as viewed in the direction perpendicular to substrate 11 (from the positive side on the X-axis) (i.e., a front-view shape). Substrate 11 has a diameter of about 8 cm, for example, but there is no particular limitation on the diameter of substrate 11.

As illustrated in FIG. 3, phosphor layer 12 is provided on the first principal surface of substrate 11. Opening 13 is provided at the center of substrate 11 to allow projection therethrough of a portion (hub, rotor, or the like) of motor 40 which is to be coupled with adjusting plate 41. Axis of rotation 3 passes through the center (central position) of substrate 11, and substrate 11 is driven by motor to rotate about axis of rotation J.

There is no particular limitation on the material of substrate 11, and any metal with favorable thermal conductivity, such as aluminum, stainless steel, or sapphire, can be used. Substrate 11 according to the present embodiment is formed of aluminum, for example. Aluminum has relatively high thermal conductivity and is lightweight. Therefore, when substrate 11 is formed of aluminum, not only can the heat dissipation performance of the phosphor wheel be increased, but the weight of the phosphor wheel can also be reduced. Substrate 11 has a thickness of, for example, 1.5 mm or less.

[Phosphor Layer 12]

Phosphor layer 12 is provided on the first principal surface of substrate 11.

Phosphor layer 12 may be formed from a resin material including a large number of yttrium aluminum garnet (YAG)-based yellow phosphor particles, for example. In such a case, the base material of the resin material is a silicone resin having a light transmissive property and a thermosetting property, for example. Phosphor layer 12 can be provided by screen-printing such a resin material on the first principal surface of substrate 11 and then thermally setting the screen-printed resin material in a heating furnace.

Phosphor layer 12 may include YAG-based yellow phosphor particles and a binder, for example. In such a case, in order to achieve higher light conversion efficiency, phosphor layer 12 favorably includes the YAG-based yellow phosphor particles in a larger amount as they contribute to the conversion of excitation light into fluorescence. In other words, phosphor layer 12 favorably has a high content by percentage of the phosphor particles. The binder is a mixture of substances other than the yellow phosphor particles constituting phosphor layer 12. The binder is formed of, for example, an inorganic substance having high thermal conductivity, such as alumina. The thermal conductivity of alumina is greater than or equal to ten times the thermal conductivity of silicone resins. Therefore, by including yellow phosphor particles and a binder formed of alumina, phosphor layer 12 can achieve high thermal conductivity.

Although not illustrated in FIG. 1 to FIG. 3, a reflective film may be provided between the first principal surface of substrate 11 and phosphor layer 12.

According to the present embodiment, in plan view, phosphor layer 12 is in a ring (annular) belt shape extending in circumferential direction θ of substrate 11 that is disc-shaped, as illustrated in FIG. 3. To be more specific, phosphor layer 12 is in a ring (annular) shape along a circumference that is at an equal distance from axis of rotation 3 serving as the center of rotation of phosphor wheel 1. In other words, the width of phosphor layer 12 in radial direction r is constant. Moreover, phosphor layer 12 is, for example, provided along the periphery of the first principal surface. Note that even when substrate 11 is not a disc-shaped substrate, phosphor layer 12 is favorably in an annular shape.

Phosphor layer 12 emits light in response to being irradiated with laser light. At this time, in order to keep the laser light from concentratedly hitting one point on phosphor layer 12, phosphor wheel 1 is rotated by motor 40 about axis of rotation 3 while phosphor layer 12 is being irradiated with laser light. This configuration inhibits phosphor particles included in phosphor layer 12 from deteriorating due to the heat produced by laser light irradiation.

[Heat Dissipating Member 30]

Heat dissipating member 30 is a plate member, disposed facing one of the first principal surface or the second principal surface of substrate 11, and rotated along with substrate 11. In the example illustrated in FIG. 1 and FIG. 2, heat dissipating member 30 is disposed facing the second principal surface of substrate 11. Phosphor layer 12 is provided on the first principal surface of substrate 11.

Figure 4:
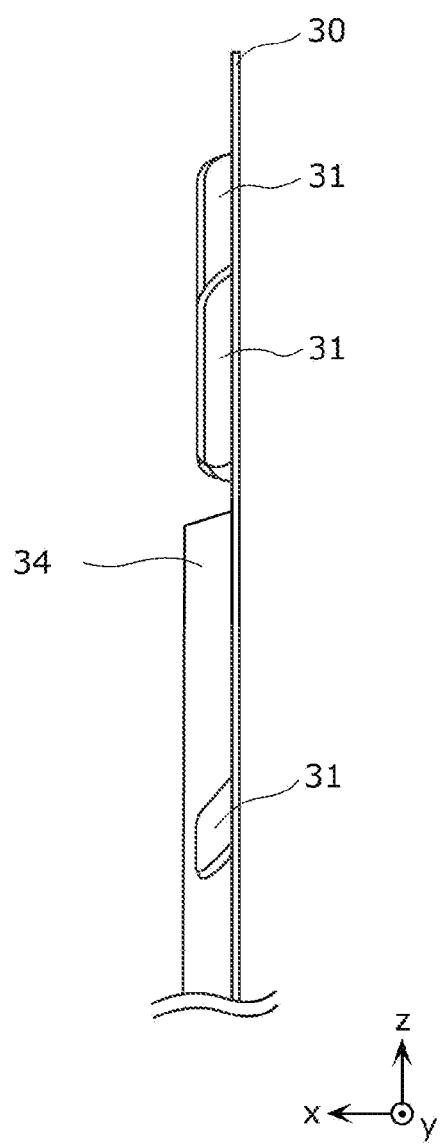
FIG. 4 is an enlarged side view of a heat dissipating member illustrated in FIG. 2.
Figure 5:
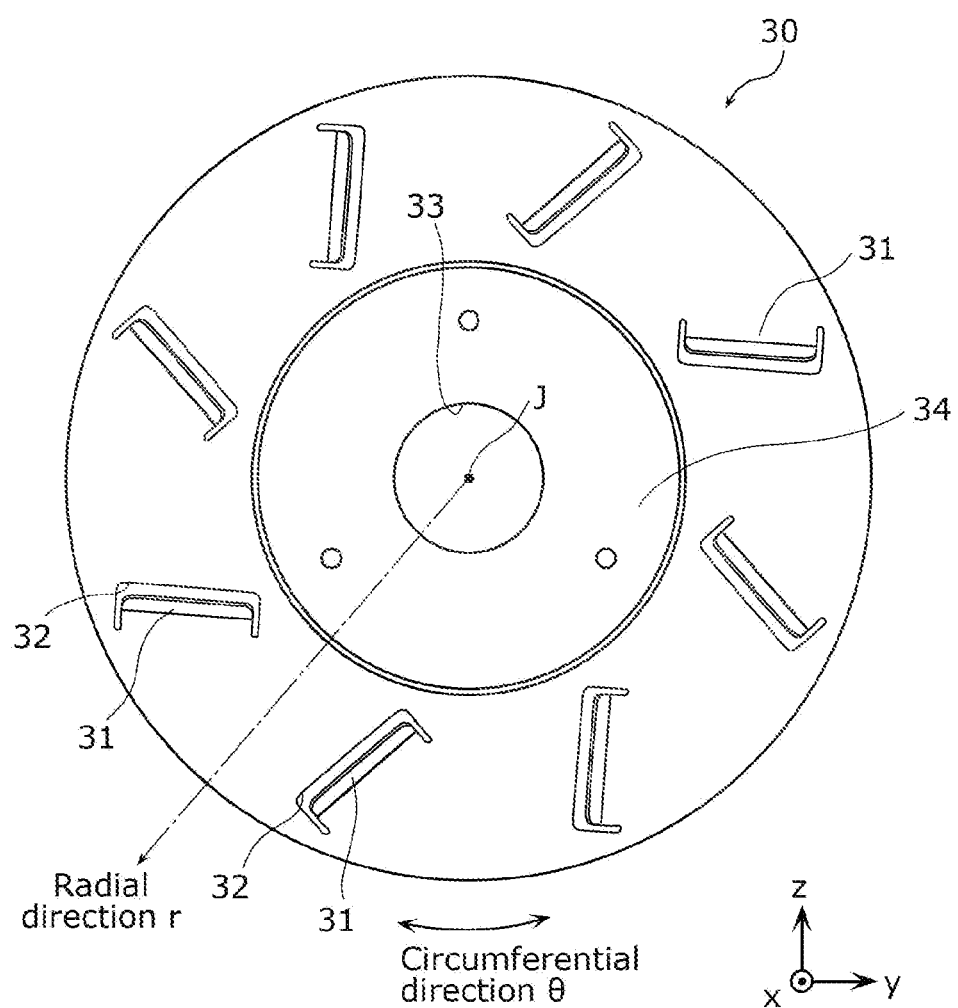
FIG. 5 is a front view of the heat dissipating member according to Embodiment 1 as viewed from the first principal surface side.
Figure 6:
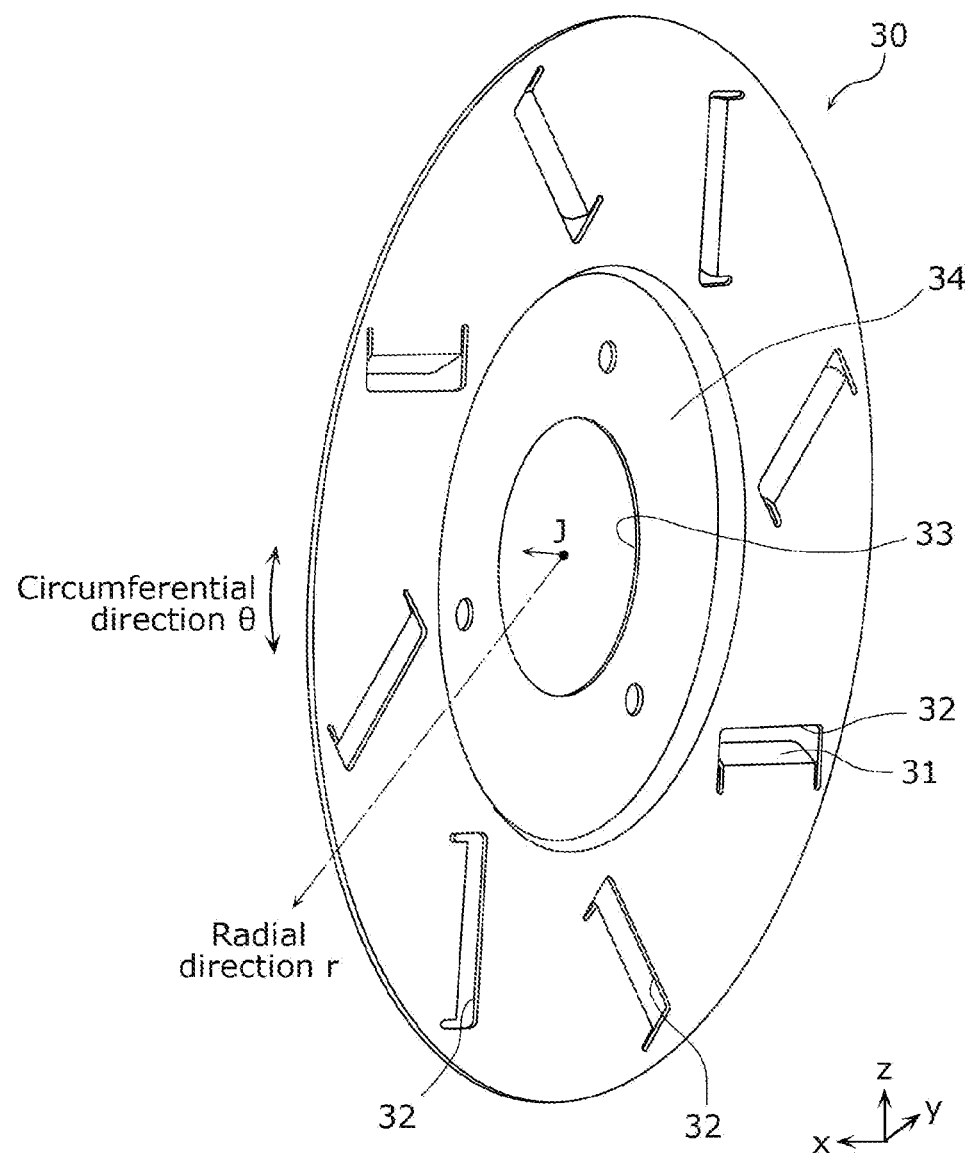
FIG. 6 is a perspective view of the heat dissipating member according to Embodiment 1 as viewed from the first principal surface side.

FIG. 4 is an enlarged side view of heat dissipating member 30 illustrated in FIG. 2. FIG. 5 is a front view of heat dissipating member 30 according to Embodiment 1 as viewed from the first principal surface side. FIG. 6 is a perspective view of heat dissipating member 30 according to Embodiment 1 as viewed from the first principal surface side. Note that, as described above, the rear surface of heat dissipating member 30 is the surface seen as heat dissipating member 30 is viewed from the side opposite its surface (front surface) facing the second principal surface of substrate 11 in the direction perpendicular to heat dissipating member 30 (i.e., viewed from the negative side on the X-axis).

Heat dissipating member 30 is a disc-shaped plate member that is driven by motor 40 to rotate about axis of rotation J. In other words, the shape of heat dissipating member 30 in plan view is circular. Note that heat dissipating member 30 has a diameter of about 7 cm, for example, but may have a diameter of from about 3 cm to 100 cm. Note that when heat dissipating member 30 is disposed facing the first principal surface of substrate 11 as will be described later, there is no particular limitation on the diameter of heat dissipating member so long as this diameter is smaller than the inner diameter of phosphor layer 12. In other words, when heat dissipating member is disposed facing the first principal surface of substrate 11, heat dissipating member 30 may have any diameter so long as it is smaller than the inner diameter of phosphor layer 12 that is in an annular belt shape and is provided on one surface of substrate 11. On the other hand, when heat dissipating member 30 is disposed facing the second principal surface of substrate 11 as illustrated in FIG. 1, the diameter of heat dissipating member 30 may be smaller than the diameter of substrate 11 and greater than the inner diameter of phosphor layer 12 or may be greater than the diameter of substrate 11.

According to the present embodiment, heat dissipating member includes a plurality of fins 31 and projecting portion 34 as illustrated in FIG. 1, FIG. 2, and FIG. 4 through FIG. 6. For example, as illustrated in FIG. 1 and FIG. 2, heat dissipating member 30 in the present embodiment is disposed facing the second principal surface of substrate 11. The plurality of fins 31 are cut and raised toward the second principal surface of substrate 11, and projecting portion 34 projects toward the second principal surface of substrate 11 as well. To be more specific, the plurality of fins 31 are formed by cutting and raising a plurality of regions 32 that are a plurality of partial regions of heat dissipating member 30 that is a plate member. The plurality of regions 32 serve as through-holes after the plurality of fins 31 are formed. The details of projecting portion 34, the plurality of fins 31, regions 32, and so on will be described later.

Although there is no particular limitation on the material of heat dissipating member 30, heat dissipating member 30 may be, for example, a plate member made of metal, such as stainless steel, iron, copper, sapphire, or aluminum.

<Projecting Portion 34>

Projecting portion 34 is provided at the central portion of heat dissipating member 30 to project toward one of the first principal surface or the second principal surface of substrate 11. Projecting portion 34 includes a contact surface that contacts the one of the first principal surface or the second principal surface. Projecting portion 34 contacts substrate 11 via the contact surface to secure a certain distance between substrate 11 and heat dissipating member 30 and conduct heat in substrate 11 to a peripheral region of heat dissipating member 30 excluding the central portion of heat dissipating member 30.

According to the present embodiment, as illustrated in FIG. 2, for example, projecting portion 34 is provided at the central portion of heat dissipating member 30 to project toward the second principal surface of substrate 11, in order to keep the distance between substrate 11 and heat dissipating member 30 constant. Projecting portion 34 is formed through drawing.

As illustrated in FIG. 2 and FIG. 4, the thickness of projecting portion 34, that is, the distance between substrate 11 and heat dissipating member 30, may be any thickness so long as it is greater than or equal to the height of the plurality of fins 31 that are formed by cutting and raising the peripheral region of heat dissipating member 30 which will be described later. For example, as illustrated in FIG. 5 and FIG. 6, projecting portion 34 includes an annular belt-shaped contact surface for contacting the second principal surface of substrate 11.

Opening 33 is provided at the center of projecting portion 34. Motor 40 and adjusting plate 41 are connected via opening 33. With this configuration, axis of rotation 3 passes through the center (central position) of heat dissipating member 30, and heat dissipating member 30, along with substrate 11, is driven by motor 40 to rotate about axis of rotation J. Note that opening 33 may have any size (diameter) so long as it is large enough for a portion of motor 40 which is to be coupled with adjusting plate 41 to pass therethrough. For example, opening 33 may have any size so long as it allows a gap of 1 mm at maximum between the edge of opening 33 and the portion of motor 40.

Projecting portion 34 has a diameter of, for example, about 3.7 cm, but this is not a limiting example. Projecting portion 34 may have any diameter so long as it is smaller than the inner diameter of heat dissipating member 30, and there is no particular limitation on the diameter of projecting portion 34 so long as it is greater than the diameter of opening 33.

As described above, projecting portion 34 is provided at the central portion of heat dissipating member 30 to include the annular belt-shaped contact surface as illustrated in FIG. 1, FIG. 2, and FIG. 4 through FIG. 6. With this configuration, projecting portion 34 functions not only as a spacer that can form an air gap (space) filled with air of a certain distance between substrate 11 and the peripheral region of heat dissipating member 30 but also as a heat conduction path via which the heat produced in phosphor layer 12 can be transmitted from substrate 11 to the peripheral region of heat dissipating member 30.

<Fins 31>

The plurality of fins 31 are formed through a cutting and raising process. To be more specific, the plurality of fins 31 are formed by cutting and raising a plurality of regions 32 located in the peripheral region of heat dissipating member 30 that is a plate member, excluding the central portion of heat dissipating member 30. The plurality of fins 31 are each cut and raised toward one of the first principal surface or the second principal surface of substrate 11. According to the present embodiment, as illustrated in FIG. 1 through FIG. 3, for example, the plurality of fins 31 are erected toward the second principal surface of substrate 11 as a result of the plurality of regions 32 being cut and raised toward the second principal surface of substrate 11.

As illustrated in FIG. 2 and FIG. 4, the height of the plurality of fins 31 is smaller than the thickness of projecting portion 34.

In the example illustrated in FIG. 1 and FIG. 2, fins 31 are formed in the peripheral region of heat dissipating member 30 within the region of heat dissipating member 30 corresponding to the region inward from the inner diameter of phosphor layer 12, but this is not a limiting example. When heat dissipating member 30 is disposed facing the first principal surface of substrate 11 and the diameter of heat dissipating member 30 is greater than the inner diameter of phosphor layer 12, fins 31 may be formed in the peripheral region of heat dissipating member 30 including a region of heat dissipating member 30 corresponding to the region of phosphor layer 12. Furthermore, when heat dissipating member 30 is disposed facing the first principal surface of substrate 11 and the diameter of heat dissipating member 30 is greater than the outer diameter of phosphor layer 12, fins 31 may be formed in the peripheral region of heat dissipating member 30 including a region of heat dissipating member corresponding to the region outward from the outer diameter of phosphor layer 12.

For example, as illustrated in FIG. 5 and FIG. 6, the plurality of fins 31 are disposed annularly in circumferential direction θ at a certain distance from the center (axis of rotation 3) in the peripheral region of heat dissipating member 30. For example, the plurality of fins 31 each have a substantially rectangular shape (substantially trapezoidal shape), and the corners at their leading end portions may each be cut off to a rounded shape. In other words, as in the example illustrated in FIG. 5 and FIG. 6, the plurality of fins 31 are each formed extending at a certain angle relative to radial direction r in the peripheral region and are each cut and raised at a certain angle relative to the second principal surface of substrate 11 (or relative to the front surface of the heat dissipating member). Note that it is sufficient so long as the plurality of fins 31 are each formed in the peripheral region, and they do not have to be formed in radial direction r. Also, the plurality of fins 31 do not have to be erected perpendicular to the second principal surface of substrate 11 (or to the front surface of heat dissipating member 30).

In the present embodiment, in response to the rotation of heat dissipating member 30, the plurality of fins 31 each send a wind outwardly (in the centrifugal direction) with axis of rotation 3 at the center. In other words, the plurality of fins 31 each send the air (fluid) present on the rear side of heat dissipating member 30 (the negative side on the X-axis) toward the outside of the space between substrate 11 and heat dissipating member 30 via the plurality of regions 32 serving as through-holes. This configuration makes it possible to cool phosphor layer 12 using the wind (airflow) generated by the flow of the air produced by the plurality of fins 31.

Note that the angle of each fin 31 relative to radial direction r and the angle of each fin 31 relative to the second principal surface are not limited to the example illustrated in FIG. 4 through FIG. 6 so long as each fin 31 can send the wind outwardly in an effective manner.

<Regions 32>

As described above, regions 32 are partial regions of heat dissipating member 30 that is a plate member, and serve as through-holes after the plurality of fins 31 are formed.

To be more specific, the plurality of regions 32 are located in the peripheral region. In addition, as illustrated in FIG. 5, as viewed toward heat dissipating member 30 from substrate 11 (as viewed from the first principal surface), the plurality of regions 32 are located at positions along virtual straight lines that each extend at a predetermined angle or greater relative to radial direction r from positions which are spaced apart from the center of heat dissipating member 30 by a predetermined distance and which lie at substantially regular intervals in circumferential direction θ. The plurality of regions 32 may be similar in shape, but are not limited to being similar in shape.

As illustrated in FIG. 5 and FIG. 6, the plurality of regions 32 serve as through-holes penetrating heat dissipating member 30 and function as vent holes through which the wind produced by the plurality of fins 31 passes. As illustrated in FIG. 5, for example, the plurality of regions 32 are located annularly in the peripheral region in circumferential direction θ at a certain distance from the center of heat dissipating member 30 (axis of rotation 3). If the plurality of regions 32 are disposed randomly, the rotation of heat dissipating member 30 becomes unstable and causes strange sounds or the like. Therefore, the plurality of regions 32 are disposed at substantially regular intervals. The plurality of regions 32 each have a substantially rectangular shape (substantially trapezoidal shape), for example, and their corners may each be cut off to a rounded shape.

As illustrated in FIG. 5, the plurality of regions 32 are each formed extending at a certain angle relative to radial direction r. Note that the plurality of regions 32 do not have to be formed in radial direction r. The angle of the plurality of regions 32 relative to radial direction r may be any angle so long as it allows the cut and raised fins 31 to send the wind outwardly in an effective manner, and the example illustrated in FIG. 5 is not a limiting example.

[Motor 40]

As illustrated in FIG. 1, for example, motor 40 is controlled by an electronic circuit (not illustrated) so as to drive and rotate substrate 11 and heat dissipating member 30. Motor 40 is, for example, an outer rotor motor, but there is no particular limitation on the type of motor 40.

Advantageous Effects Etc

As described above, phosphor wheel 1 according to the present embodiment includes: substrate 11 including a first principal surface and a second principal surface on opposite sides of substrate 11; phosphor layer 12 provided on the first principal surface; and heat dissipating member 30 disposed facing the second principal surface of substrate 11 and rotated along with substrate 11. Heat dissipating member 30 is a plate member. Heat dissipating member 30 includes: a projecting portion that is provided at a central portion of heat dissipating member 30 to project toward the second principal surface and includes a contact surface that contacts the second principal surface; and a plurality of fins provided by cutting and raising a plurality of regions in a peripheral region of heat dissipating member excluding the central portion. Projecting portion 34 contacts substrate 11 via the contact surface to secure a certain distance between substrate 11 and heat dissipating member 30 and conduct heat in substrate 11 to the peripheral region of heat dissipating member 30.

As described, phosphor wheel 1 according to the present embodiment is a reflective phosphor wheel and includes phosphor layer 12 only on the first principal surface of substrate 11. Since phosphor wheel 1 includes heat dissipating member 30 having projecting portion 34, it is possible to create a space of a certain distance between substrate 11 and heat dissipating member 30. With this configuration, the wind produced by the plurality of fins 31 can be sent toward the outside of the space between substrate 11 and heat dissipating member 30 via the plurality of regions 32 (through-holes). In other words, the wind produced by the plurality of fins 31 can be used to cool phosphor layer 12.

Accordingly, the heat dissipation performance of phosphor wheel 1 can be improved. Moreover, in phosphor wheel 1, since substrate 11 and projecting portion 34 contact each other, it is possible to create a heat conduction path for transmitting, from substrate 11, the heat produced in phosphor layer 12 to the peripheral region of heat dissipating member 30. As a result, the heat dissipation performance can be further improved.

With the configuration described above, phosphor wheel 1 with further improved heat dissipation performance can be achieved.

Furthermore, the plurality of fins of heat dissipating member can be formed simply since they are formed by cutting and raising the plurality of regions of the plate member. As a result, the cost can be reduced as compared to the case of manufacturing the plurality of fins through shaving.

As described above, opening 33 formed at the center of heat dissipating member 30 may have any size so long as it is large enough for a portion of motor 40 which is to be coupled with adjusting plate 41 to pass therethrough; however, this is not a limiting example. Opening 33 may have a greater size to be used for ventilation. That is to say, heat dissipating member 30 may include, at the central portion thereof, opening 33 formed for ventilation, and axis of rotation 3 of heat dissipating member 30 which is rotated along with substrate 11 may pass through opening 33.

With this configuration, the wind produced by the plurality of fins 31 can be sent toward the outside of the space (air gap) between substrate 11 and heat dissipating member 30 not only via the plurality of regions 32 (through-holes) but also via opening 33. Accordingly, the amount of the wind passing through the space between substrate 11 and heat dissipating member 30 for cooling phosphor layer 12 can be increased, and it is therefore possible to further improve the heat dissipation performance of phosphor wheel 1.

Note that the configuration of phosphor wheel 1 is not limited to the aspect described above. In order to further improve the heat dissipation performance, fins may be formed in substrate 11, or an opening serving as a through-hole may be formed in substrate 11.

Figure 7:
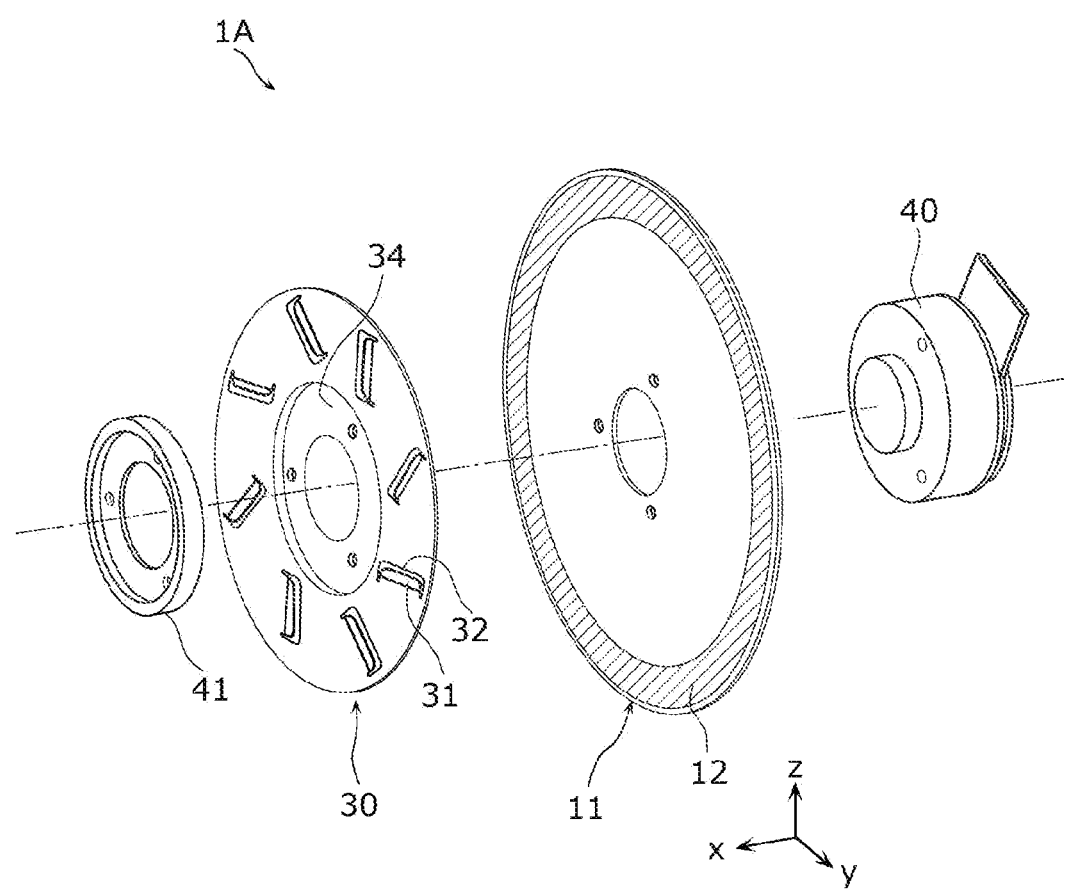
FIG. 7 is an exploded perspective view of a phosphor wheel according to another aspect of Embodiment 1.

According to Embodiment 1, heat dissipating member 30 included in phosphor wheel 1 is disposed facing the second principal surface of substrate 11 as illustrated in the example in FIG. 1 and FIG. 2; however, this is not a limiting example. FIG. 7 is an exploded perspective view of phosphor wheel 1A according to another aspect of Embodiment 1. Specifically, as in phosphor wheel 1A illustrated in FIG. 7, heat dissipating member 30 may be disposed facing the first principal surface of substrate 11 on which phosphor layer 12 is provided. In this case, it is sufficient so long as the plurality of fins 31 are cut and raised toward the first principal surface of substrate 11 and projecting portion 34 is formed projecting toward the first principal surface of substrate 11. Furthermore, in such a case, instead of providing projecting portion 34 in heat dissipating member 30, adjusting plate 41 may function also as projecting portion 34. Heat dissipating member 30 and adjusting plate 41 that functions also as projecting portion 34 may be integrated into one unit. This configuration can further reduce the number of components and thus reduce the cost.

Embodiment 2

Phosphor wheel 1 etc. with improved heat dissipation performance has been described in Embodiment 1, but phosphor wheel 1 etc. is not limited to the above aspect. To further improve the heat dissipation performance, through-holes may be further formed in the projecting portion of the heat dissipating member included in phosphor wheel 1. Such a heat dissipating member will be described in Embodiment 2 below. The following description focuses on the points different from heat dissipating member 30 described in Embodiment 1.

[Heat Dissipating Member 30B]

Figure 8:
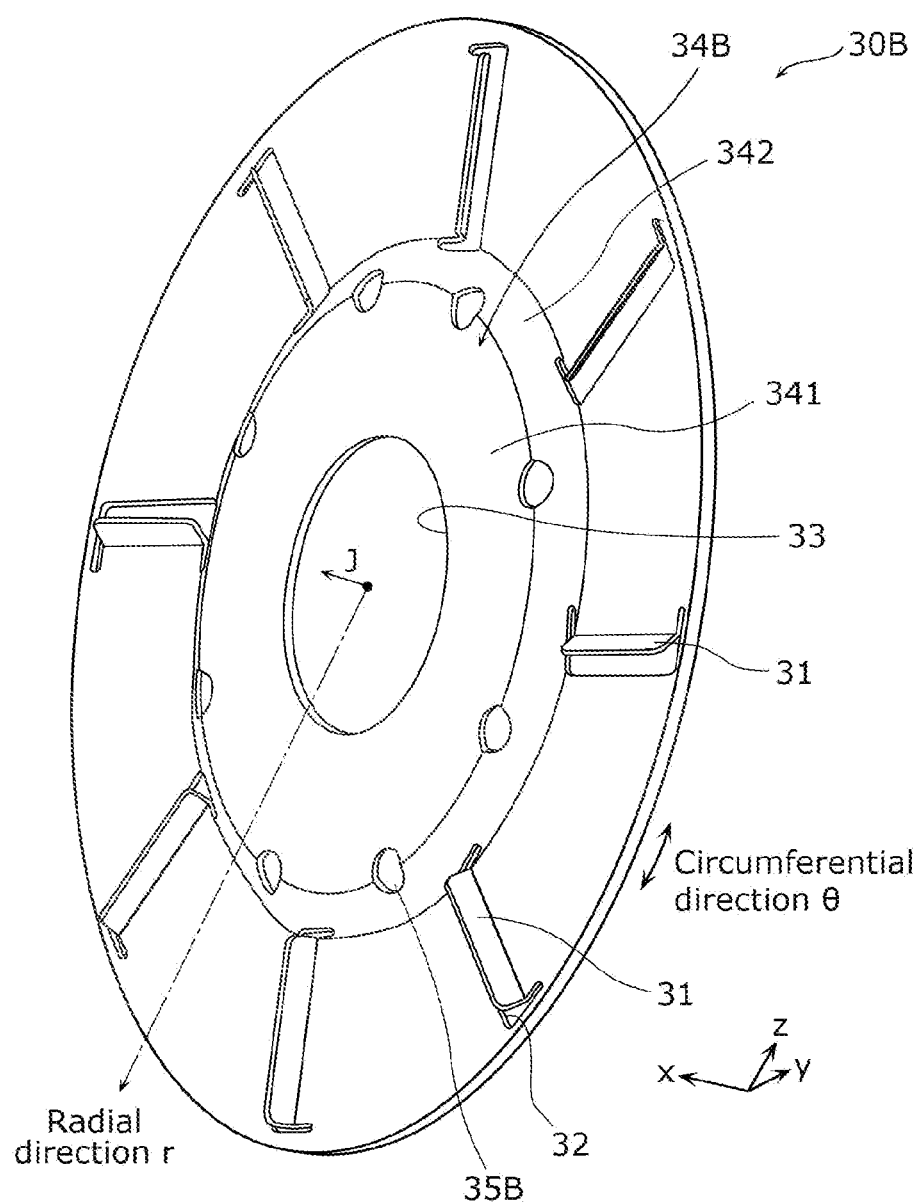
FIG. 8 is a front perspective view of a heat dissipating member according to Embodiment 2 as viewed from the first principal surface side.
Figure 9:
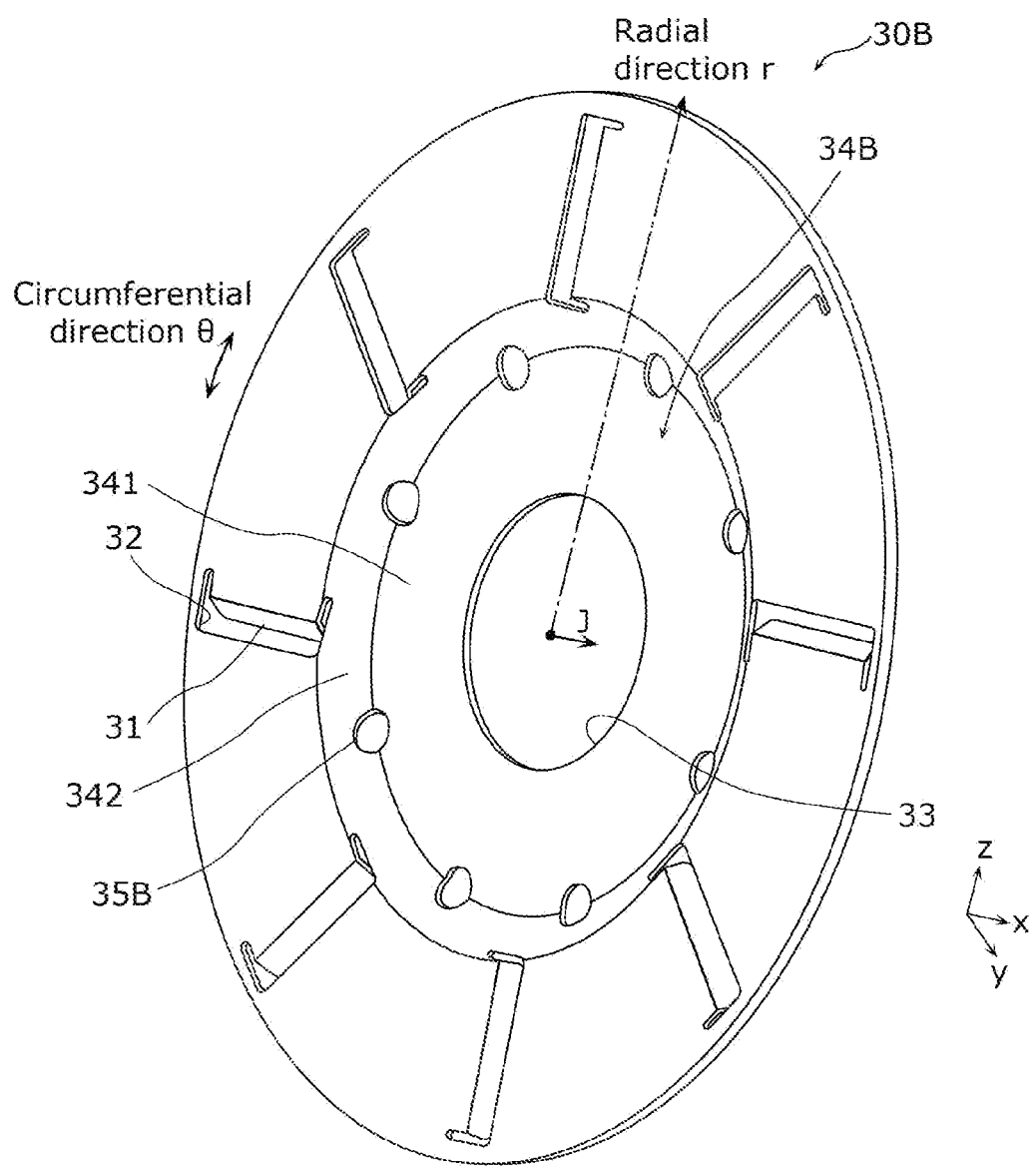
FIG. 9 is a rear perspective view of the heat dissipating member according to Embodiment 2 as viewed from the second principal surface side.
Figure 10:
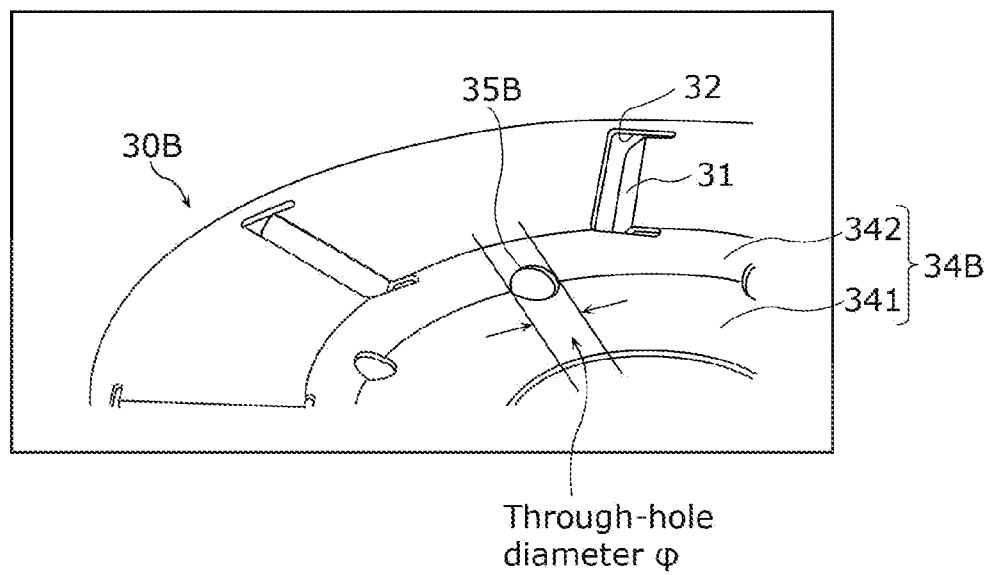
FIG. 10 is an enlarged view of part of the heat dissipating member illustrated in FIG. 9.

FIG. 8 is a front perspective view of heat dissipating member 30B according to Embodiment 2 as viewed from the first principal surface side. FIG. 9 is a rear perspective view of heat dissipating member 30B according to Embodiment 2 as viewed from the second principal surface side. FIG. 10 is an enlarged view of part of heat dissipating member 30B illustrated in FIG. 9. Note that constituent elements which are the same as those in, for example, FIGS. 5 and FIG. 6 are given the same reference signs, and detailed descriptions thereof will be omitted.

Heat dissipating member 30B illustrated in FIG. 8 and FIG. 9 are different from heat dissipating member 30 illustrated in FIG. 5 and FIG. 6 in that through-holes 35B are further formed in projecting portion 34B.

<Projecting Portion 34B>

As in Embodiment 1, projecting portion 34B is provided at the central portion of heat dissipating member 30B to project toward one of the first principal surface or the second principal surface of substrate 11. Projecting portion 34B includes: contact surface 341 that contacts the one of the first principal surface or the second principal surface; and peripheral wall 342 to which contact surface 341 serves as the bottom surface.

As in Embodiment 1, projecting portion 34B is provided at the central portion of heat dissipating member 30B to project toward the second principal surface of substrate 11, in order to keep the distance between substrate 11 and heat dissipating member 30B constant. Projecting portion 34B is formed through drawing. Note that the diameters and so on of projecting portion 34B and opening 33 provided at the center of projecting portion 34B are as described in Embodiment 1, and thus the description thereof will be omitted.

As described, as in Embodiment 1, projecting portion 34B functions as a spacer that can form an air gap (space) filled with air of a certain distance between substrate 11 and the peripheral region of heat dissipating member 30B. By contacting substrate 11 via contact surface 341, projecting portion 34B functions also as a heat conduction path via which the heat produced in phosphor layer 12 can be transmitted from substrate 11 to the peripheral region of heat dissipating member 30B.

In addition, in the present embodiment, projecting portion 34B includes, in peripheral wall 342, a plurality of through-holes 35B formed for ventilation.

<Through-Holes 35B>

Through-holes 35B are provided in peripheral wall 342 of projecting portion 34B. To be more specific, each of the plurality of through-holes 35B is formed in a boundary portion between peripheral wall 342 and contact surface 341 as illustrated in FIG. 8 through FIG. 10. That is to say, each of the plurality of through-holes 35B is formed straddling the boundary between peripheral wall 342 and contact surface 341.

The plurality of through-holes 35B are formed at positions different from regions between the plurality of fins 31 and axis of rotation 3 of heat dissipating member 30B. In other words, through-holes 35B and fins 31 are not aligned in radial direction r.

Now, the dimensions of through-holes 35B will be described with reference to FIG. 10. When the outer diameter of heat dissipating member 30B is, for example, φ70 mm to 80 mm and the length of each region 32 in radial direction r (length in the longitudinal direction) is about 11 mm to 14 mm, the outer diameter of contact surface 341 is about φ35 mm to 38 mm and the diameter of each through-hole 35B is about φ3 mm.

[Advantageous Effects etc.]

As described above, phosphor wheel 1, 1A according to the present embodiment includes through-holes 35B straddling the boundary between peripheral wall 342 and contact surface 341 of projecting portion 34B in the boundary portion between heat dissipating member 30B and projecting portion 34B.

This configuration makes it possible to further promote the flows of fluids (air) produced between phosphor layer 12 and heat dissipating member 30B. As a result, the temperature of phosphor layer 12 can be further reduced, and therefore, the heat dissipation performance of phosphor wheel 1, 1A can be improved.

A prototype of phosphor wheel 1, 1A according to the present embodiment having the above-described configuration was made, and a rise in the temperature of phosphor layer 12 caused by operation of the prototype for a predetermined period of time was verified. The result of the verification will be described below. As a comparative example, a prototype of phosphor wheel 1, 1A according to Embodiment 1 that does not include through-holes 35B was also verified.

In the present embodiment, the verification result showed that the temperature of phosphor layer 12 rose by 115.7° C. In the comparative example, the verification result showed that the temperature of phosphor layer 12 rose by 119.5° C. That is to say, the rise in the temperature of phosphor layer 12 according to the present embodiment was lower than the rise in the temperature of phosphor layer 12 according to the comparative example.

Figure 11:
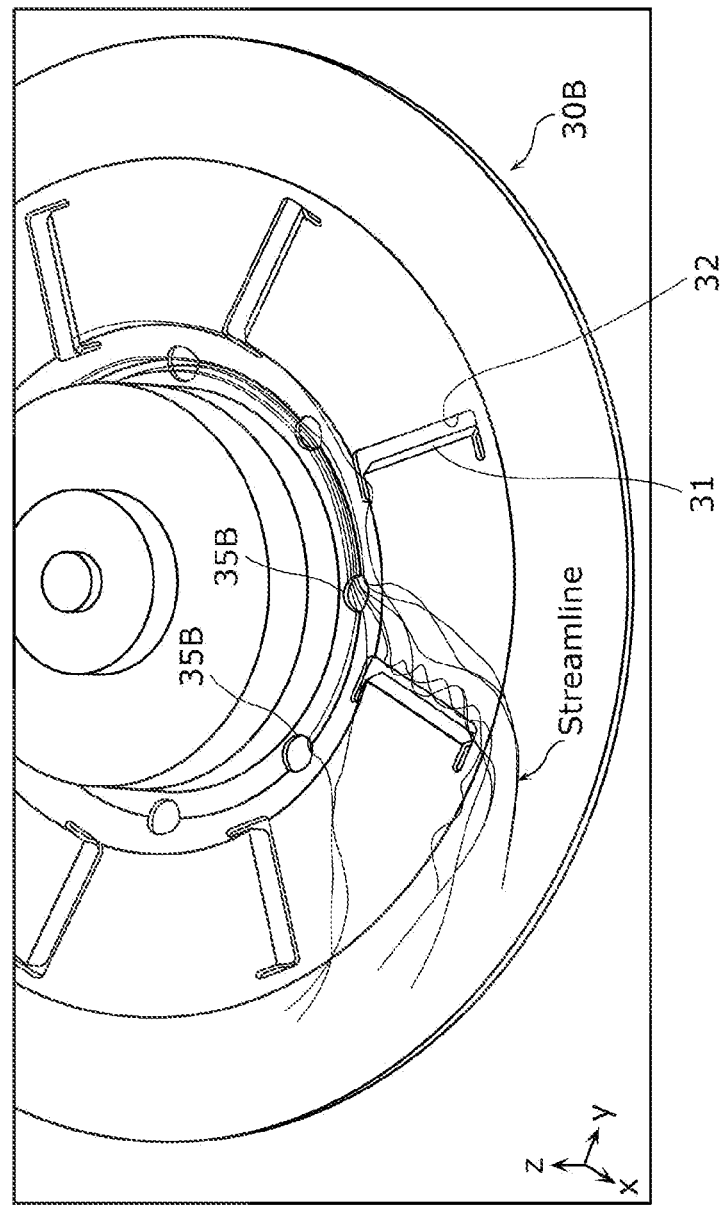
FIG. 11 is a diagram illustrating an analysis result of flows of fluids in the vicinity of fins of the heat dissipating member according to Embodiment 2.

FIG. 11 is a diagram illustrating an analysis result of the flows of fluids in the vicinity of fins 31 of heat dissipating member 30B according to Embodiment 2. FIG. 11 illustrates, with streamlines, flows of fluids (air) moving toward the regions in the vicinity of fins 31 via through-holes 35B. Note that the streamlines illustrated in FIG. 11 show the flows of fluids (air) in the form of vectors.

As described earlier, fins 31 have the function of raking out, in the direction toward the outer periphery of heat dissipating member 30, 30B, the fluids (air) present in the region between substrate 11 and the flat portion of heat dissipating member 30, 30B on which fins 31 are provided (see FIG. 1 and FIG. 7, for example). With phosphor wheel 1, 1A according to Embodiments 1 and 2, this function promotes heat transfer by convection, and therefore, the temperature of phosphor layer 12 provided on substrate 11 can be reduced.

In the present embodiment, heat dissipating member 30B further includes through-holes 35B, and therefore, as illustrated in FIG. 11, the fluids (air) moving in the direction toward the outer periphery of heat dissipating member 30B via through-holes 35B hit fins 31 partway. Since heat dissipating member 30B of phosphor wheel 1, 1A according to Embodiment 2 includes through-holes 35B, it is possible to promote heat transfer by convection and thus increase the heat dissipation as compared to the case of not including through-holes 35B (the case where phosphor wheel 1, 1A does not include through-holes 35B).

[Variations]

Figure 12:
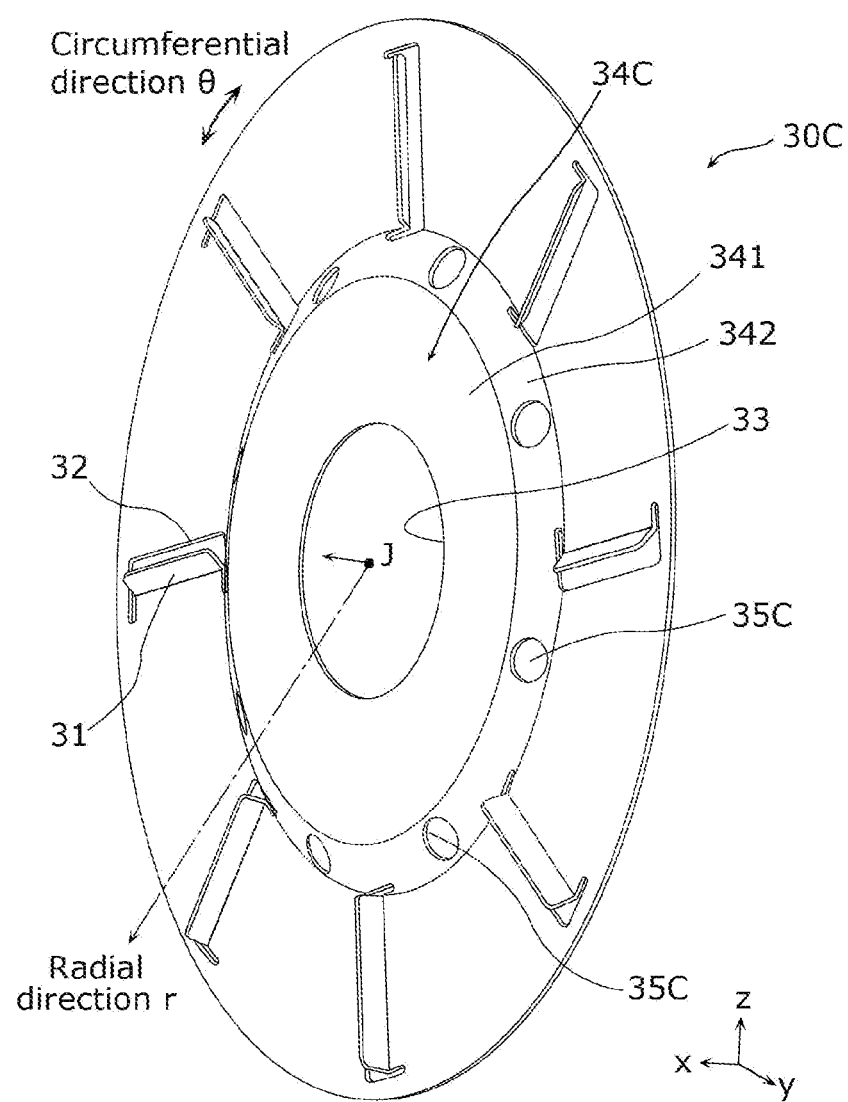
FIG. 12 is a front perspective view of a heat dissipating member according to a variation of Embodiment 2 as viewed from the first principal surface side.

As described in Embodiment 2 above, through-holes 35B are formed straddling the boundary between peripheral wall 342 and contact surface 341 of projecting portion 34B in the boundary portion between heat dissipating member 30B and projecting portion 34B, but this is not a limiting example. As illustrated in FIG. 12, through-holes 35C may be formed only in peripheral wall 342 of projecting portion 34B.

FIG. 12 is a front perspective view of heat dissipating member 30C according to the variation of Embodiment 2 as viewed from the first principal surface side. Note that constituent elements which are the same as those in, for example, FIG. 8 and FIG. 9 are given the same reference signs, and detailed descriptions thereof will be omitted.

Heat dissipating member 30C illustrated in FIG. 12 is different from heat dissipating member 30B illustrated in FIG. 8 and FIG. 9 in positions of a plurality of through-holes 35C formed in projecting portion 34C for ventilation. The other aspects are the same as those of through-holes 35B described above.

To be more specific, through-holes 35C are provided in peripheral wall 342 of projecting portion 34C. As illustrated in FIG. 12, each of the plurality of through-holes 35C is formed only in peripheral wall 342 and is formed at the center of peripheral wall 342 as viewed in the direction from heat dissipating member 30C toward contact surface 341. Note that, as with the plurality of through-holes 35B, the plurality of through-holes 35C are formed at positions different from the regions between the plurality of fins 31 and axis of rotation 3 of heat dissipating member 30C. In other words, through-holes 35C and fins 31 are not aligned in radial direction r.

This configuration makes it possible to further promote the flows of fluids (air) produced between phosphor layer 12 and heat dissipating member 30C. As a result, the temperature of phosphor layer 12 can be further reduced, and therefore, the heat dissipation performance of phosphor wheel 1, 1A can be improved.

Note that the scope of Embodiment 2 does not encompass through-holes that are formed in the boundary portion between peripheral wall 342 of projecting portion 34C and the flat portion of heat dissipating member 30C on which fins 31 are provided and that are formed straddling the boundary between peripheral wall 342 and the flat portion of heat dissipating member 30C on which fins 31 are provided. This is because such through-holes cannot promote the flows of fluids (air) produced between phosphor layer 12 and heat dissipating member 30C. Hereinafter, such through-holes will be briefly described as a comparative example.

Figure 13:
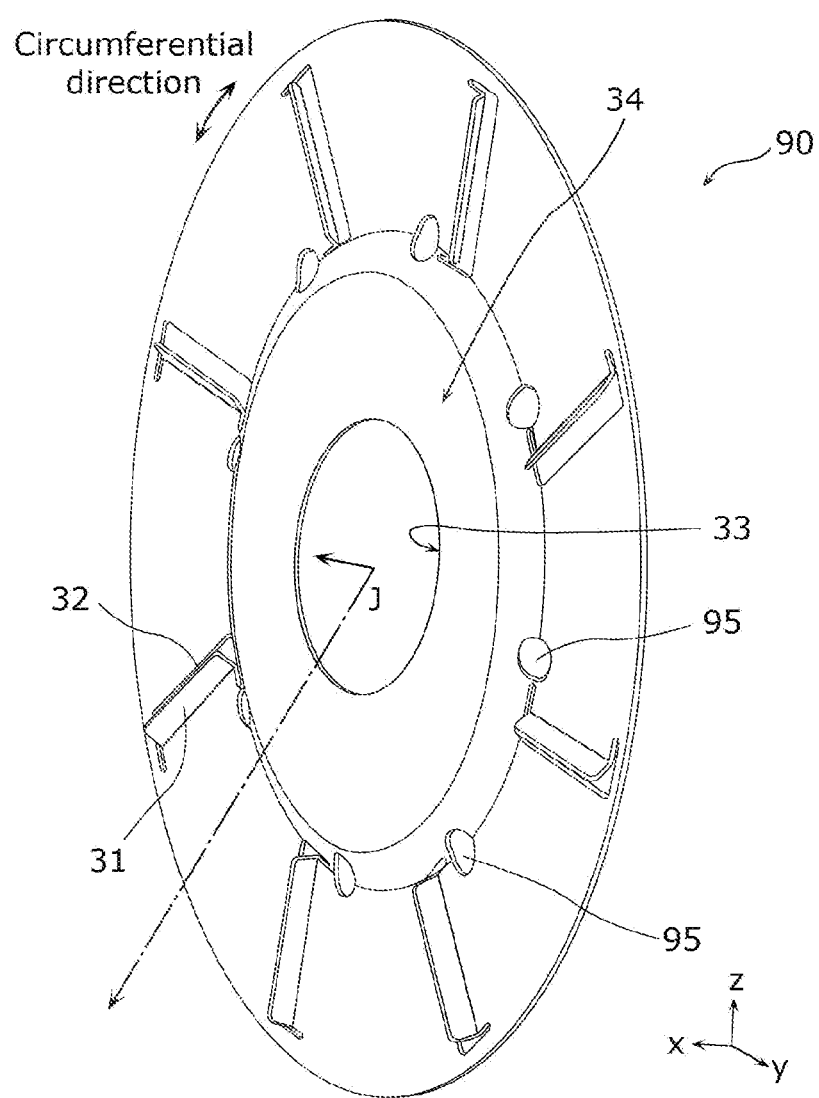
FIG. 13 is a front perspective view of a heat dissipating member according to a comparative example as viewed from the first principal surface side.
Figure 14:
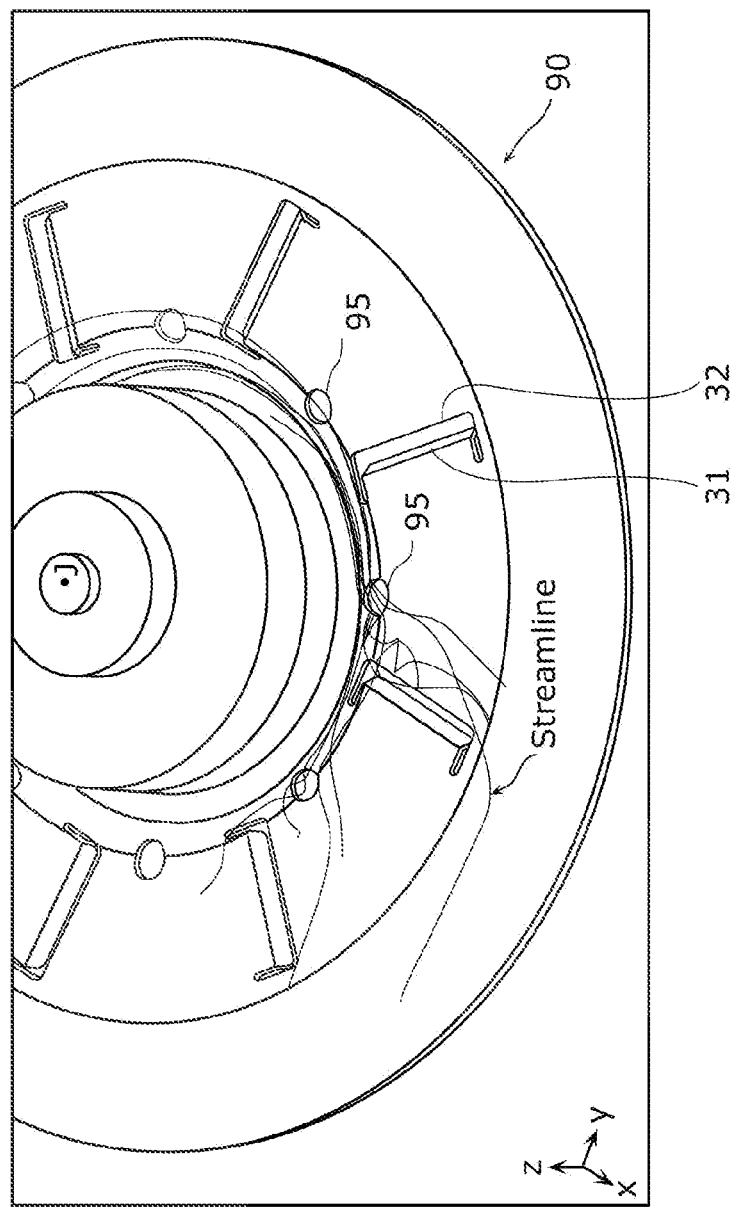
FIG. 14 is a diagram illustrating an analysis result of flows of fluids in the vicinity of fins of the heat dissipating member according to the comparative example.

FIG. 13 is a front perspective view of heat dissipating member 90 according to a comparative example as viewed from the first principal surface side. Note that constituent elements which are the same as those in FIG. 12 are given the same reference signs, and detailed descriptions thereof will be omitted. FIG. 14 is a diagram illustrating an analysis result of the flows of fluids in the vicinity of fins 31 of heat dissipating member 90 according to the comparative example. FIG. 14 illustrates, with streamlines, the flows of fluids (air) moving toward fins 31 via through-holes 95.

As illustrated in FIG. 13, heat dissipating member 90 according to the comparative example is different from heat dissipating member 30B illustrated in FIG. 8 and FIG. 9 and heat dissipating member 30C illustrated in FIG. 12 in positions of through-holes 95 formed in projecting portion 34. To be more specific, through-holes 95 provided in projecting portion 34 are, as illustrated in FIG. 13, formed in the boundary portion between the flat portion of heat dissipating member 90 on which fins 31 are provided and peripheral wall 342 of projecting portion 34, and formed straddling the boundary between the flat portion of heat dissipating member 90 on which fins 31 are provided and peripheral wall 342.

With heat dissipating member 90 that includes through-holes 95 as illustrated in FIG. 13, there are few trajectories (streamlines) of fluids (air) passing through through-holes 95, hitting fins 31, and moving out to the outer periphery of heat dissipating member 90, whereas there are many trajectories (streamlines) of fluids not hitting fins 31 but passing through the region close to axis of rotation 3 rather than the regions of fins 31, as illustrated in FIG. 14. As a result, as compared to heat dissipating member 30B (30C) that includes through-holes 35B (through-holes 35C) as illustrated in FIG. 8, the flows of fluids (air) produced between phosphor layer 12 and heat dissipating member 90 cannot be promoted, and thus, heat transfer by convection cannot be promoted.

Other Embodiments Etc

The embodiments and variations described above are mere examples, and various changes, additions, omissions, and so on, can be carried out.

The present disclosure also encompasses forms implemented by arbitrarily combining the constituent elements and functions described in the embodiments and variations described above. The present disclosure also encompasses other forms achieved by making various modifications to the above embodiments and variations that are conceivable to those skilled in the art, as well as forms implemented by arbitrarily combining the constituent elements and functions of each embodiment without departing from the essence of the present disclosure. For example, a new embodiment can be formed by combining the constituent elements described in the embodiments and variations.

The constituent elements described in the accompanying drawings and the detailed description may include, not only the constituent elements essential to solving a problem, but also constituent elements not essential to solving the problem, in order to provide examples of the techniques described above. Thus, these non-essential constituent elements should not be deemed essential due to the mere fact that they are included in the accompanying drawings and the detailed description.

In addition, the present disclosure also encompasses a light source device or a laser projector which includes a phosphor wheel as described below.

That is to say, the present disclosure encompasses a light source device which includes: the phosphor wheel described in the embodiments and the variations above; an excitation light source such as a laser light source; and an optical system that guides light emitted from the excitation light source to the phosphor wheel. The present disclosure also encompasses a projection-type video display device which includes: the phosphor wheel described in the embodiments and the variations above; a motor that rotates the phosphor wheel; a laser light source that irradiates a phosphor layer with laser light; an optical modulation element that modulates, based on a video signal, light emitted from the phosphor layer in response to the laser light received from the laser light source; and a projection lens that projects the light modulated by the optical modulation element.

INDUSTRIAL APPLICABILITY

The phosphor wheel according to the present disclosure can be applied, as a reflective phosphor wheel, to, for example, a projection-type video display device and a light source of a laser projector, an illumination device for facilities, an endoscope, or the like.

REFERENCE SIGNS LIST 1, 1A phosphor wheel
11 substrate
12 phosphor layer
30, 30B, 30C, 90 heat dissipating member
31 fin
32 region
33 opening
34, 34B, 34C projecting portion
35B, 35C, 95 through-hole
40 motor
41 adjusting plate
341 contact surface
342 peripheral wall

The invention claimed is:

1. A phosphor wheel comprising:
a substrate including a first principal surface and a second principal surface on opposite sides of the substrate;
a phosphor layer provided on the first principal surface; and
a heat dissipating member disposed facing one of the first principal surface or the second principal surface and rotated along with the substrate, the heat dissipating member being a plate member,
wherein the heat dissipating member includes:
a projecting portion provided at a central portion of the heat dissipating member to project toward the one of the first principal surface or the second principal surface, the projecting portion including (i) a contact surface that contacts the one of the first principal surface or the second principal surface and (ii) a peripheral wall to which the contact surface serves as a bottom surface; and
a plurality of fins provided by cutting and raising a plurality of regions in a peripheral region of the heat dissipating member excluding the central portion,
the projecting portion includes, in the peripheral wall, a plurality of through-holes provided for ventilation, and
the projecting portion contacts the substrate via the contact surface to secure a certain distance between the substrate and the heat dissipating member and conduct heat in the substrate to the peripheral region of the heat dissipating member.

2. The phosphor wheel according to claim 1,
wherein each of the plurality of through-holes is provided straddling a boundary between the peripheral wall and the contact surface.

3. The phosphor wheel according to claim 1,
wherein each of the plurality of through-holes is provided only in the peripheral wall and is provided at a center of the peripheral wall as viewed in a direction from the heat dissipating member toward the contact surface.

4. The phosphor wheel according to claim 1,
wherein the plurality of through-holes are provided at positions different from regions between the plurality of fins and an axis of rotation of the heat dissipating member.

5. The phosphor wheel according to claim 1,
wherein the plurality of fins are each cut and raised toward the one of the first principal surface or the second principal surface.

6. The phosphor wheel according to claim 1,
wherein the phosphor layer is in an annular belt shape and is provided on one surface of the substrate, and
a diameter of the heat dissipating member is smaller than an inner diameter of the phosphor layer.

7. The phosphor wheel according to claim 1,
wherein the substrate is disc-shaped, and
the phosphor layer is in a belt shape extending in a circumferential direction of the substrate.

* * * * *